US008797577B2

(12) United States Patent
Kaigawa (10) Patent No.: US 8,797,577 B2
(45) Date of Patent: Aug. 5, 2014

(54) TERMINAL DEVICE CONFIGURED TO CONTROL THE TRANSMISSION OF DATA ACCORDING TO THE DATA TYPE

(75) Inventor: Shinsuke Kaigawa, Kitanagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 353 days.

(21) Appl. No.: 13/205,041

(22) Filed: Aug. 8, 2011

(65) Prior Publication Data

US 2012/0033261 A1   Feb. 9, 2012

(30) Foreign Application Priority Data

Aug. 6, 2010   (JP) ................................. 2010-177708

(51) Int. Cl.
*G06F 3/12* (2006.01)
*G06F 15/00* (2006.01)
*G06K 1/00* (2006.01)
*H04N 1/60* (2006.01)

(52) U.S. Cl.
USPC ............................ 358/1.15; 358/1.13; 358/1.9

(58) Field of Classification Search
None
See application file for complete search history.

(56) References Cited

U.S. PATENT DOCUMENTS

| 5,530,872 | A | 6/1996 | Smeltzer et al. |
| 7,016,061 | B1 * | 3/2006 | Hewitt ......................... 358/1.15 |
| 7,800,649 | B2 * | 9/2010 | Masumoto et al. ........ 348/207.2 |
| 2002/0113998 | A1 | 8/2002 | Fujinawa |
| 2003/0074480 | A1 * | 4/2003 | Kelliher ........................ 709/253 |
| 2004/0046991 | A1 * | 3/2004 | Kim ............................. 358/1.15 |
| 2004/0218204 | A1 | 11/2004 | Nomura |
| 2005/0083837 | A1 * | 4/2005 | Maehara et al. .............. 370/229 |
| 2005/0271446 | A1 | 12/2005 | Minowa |
| 2006/0176509 | A1 | 8/2006 | Aoki et al. |
| 2007/0027990 | A1 | 2/2007 | Nakaoka et al. |

FOREIGN PATENT DOCUMENTS

| CN | 1702696 A | 11/2005 |
| CN | 1770141 A | 5/2006 |
| JP | S62-109455 A | 5/1987 |
| JP | H07-221664 A | 8/1995 |
| JP | 2002-247277 A | 8/2002 |
| JP | 2004-130784 | 4/2004 |
| JP | 2004-356826 A | 12/2004 |
| JP | 2006-163568 | 6/2006 |
| JP | 2008-53945 | 3/2008 |
| WO | WO 02/41107 A2 | 5/2002 |

OTHER PUBLICATIONS

Chinese Office action dated Aug. 22, 2013 from related Chinese Application No. 201110228982.6, together with an English language translation.
Extended European Search Report dated Oct. 16, 2012 received from related European Application No. 11176473.4.
Notification of Reasons for Rejection dated Jun. 19, 2012 received from the Japanese Patent Office from related Japanese Application No. 2010-177708, together with an English-language translation.
Decision of Rejection dated Mar. 5, 2014 from related Chinese Application No. 201110228982.6, together with an English language translation.

* cited by examiner

*Primary Examiner* — Ming Hon
(74) *Attorney, Agent, or Firm* — Scully, Scott, Murphy & Presser PC (57) ABSTRACT

A terminal device may be configured to perform a first sending process for sending a first type of data to an external device. The terminal device may be configured to perform a second sending process for sending a second type of data to the external device. The terminal device may be configured to measure time related to a period of duration of the second sending process. The terminal device may continues to perform the first sending process until sending all of the first type of data is completed. The terminal device may continue to perform the second sending process until the time elapses first predetermined time and cancel to perform the second sending process when the time elapses the first predetermined time even if sending all of the second type of data has not been completed.

10 Claims, 6 Drawing Sheets

Print Data Sending Process

FIG. 6B

Cancel Data Sending Process

TERMINAL DEVICE CONFIGURED TO CONTROL THE TRANSMISSION OF DATA ACCORDING TO THE DATA TYPE

CROSS-REFERENCE TO RELATED APPLICATIONS

This application claims priority to Japanese Patent Application No. 2010-177708, filed on Aug. 6, 2010, the contents of which are hereby incorporated by reference into the present application.

TECHNICAL FIELD

The present specification discloses a terminal device configured to be connected with an external device via a network.

DESCRIPTION OF RELATED ART

A computer configured to be connected with a printer is known. The computer activates a timer when print data is to be sent to the printer. When a count value of the timer reaches a predetermined value, the computer cancels sending print data even if sending all of print data has not been completed.

SUMMARY

For some types of data, sending the data is favorably canceled when all of data has not been sent even after a certain amount of time has elapsed from the start of a sending process for sending the data to an external device (in the example described above, the "printer"), whereas for other types data, sending of data is favorably continued until the data is normally sent. The present application provides an art capable of appropriately controlling sending of data according to type of data.

An art disclosed by the present specification is a terminal device configured to be connected with an external device via a network. The terminal device may comprise a first sending unit, a second sending unit and a first measuring unit. The first sending unit may be configured to perform a first sending process for sending a first type of data to the external device. The second sending unit may be configured to perform a second sending process for sending a second type of data to the external device. The first measuring unit may be configured to measure time related to a period of duration of the second sending process. The first sending unit may continue to perform the first sending process until sending all of the first type of data is completed. The second sending unit may continue to perform the second sending process until the time measured by the first measuring unit elapses first predetermined time. The second sending unit may cancel to perform the second sending process when the time measured by the first measuring unit elapses the first predetermined time even if sending all of the second type of data has not been completed.

A system comprising the terminal device and the external device described above is also novel and useful. Further, a control method and a computer program for realizing the terminal device described above, and a computer readable recording device which includes the computer program, are also novel and useful.

EMBODIMENT (Configuration of Network System)

Figure 1:
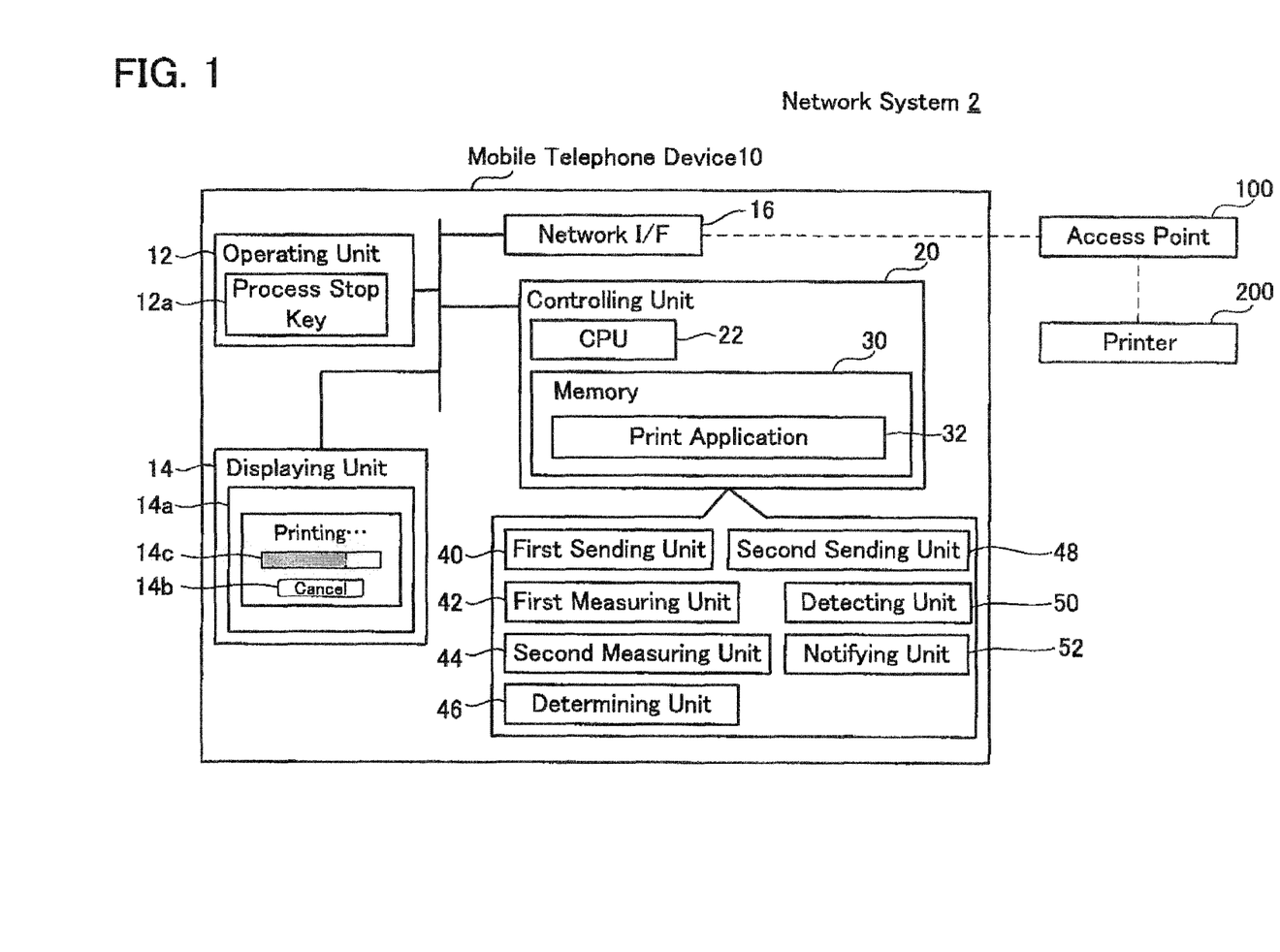
FIG. 1 shows an example of a configuration of a network system.

An embodiment will be described with reference to the drawings. As shown in FIG. 1, a network system 2 includes a mobile telephone device 10, an access point 100, and a printer 200. The mobile telephone device 10 is wirelessly connected with the access point 100 and is capable of communicating thereby. The printer 200 is wirelessly connected with the access point 100 and is capable of communicating thereby. The mobile telephone device 10 is capable of communicating with the printer 200 via the access point 100. The printer 200 prints an image represented by print data acquired from a terminal device (e.g., the mobile telephone device 10) onto a printing medium. Moreover, the dashed lines in FIG. 1 indicate that the respective devices on both ends of the dashed lines are capable of communicating wirelessly.

(Configuration of Mobile Telephone Device)

The mobile telephone device 10 is a type of portable terminal device (such as a portable music player, a PDA, a note PC, and a tablet PC). The mobile telephone device 10 includes an operating unit 12, a displaying unit 14, a network interface 16, and a controlling unit 20. The controlling unit 20 includes a CPU 22 and a memory 30. The CPU 22 performs processes according to a print application 32 stored in the memory 30. Due to the CPU 22 performing processes according to the print application 32, functions of a first sending unit 40, a first measuring unit 42, a second measuring unit 44, a determining unit 46, a second sending unit 48, a detecting unit 50, and a notifying unit 52 are realized. Moreover, the print application 32 may be installed in advance in the mobile telephone device 10 upon shipment of the mobile telephone device 10, installed to the mobile telephone device 10 from a server provided by a manufacturer of the printer 200, or installed to the mobile telephone device 10 from a medium such as a memory card.

The operating unit 12 is constituted by a plurality of keys (e.g., a numerical keypad, a hook key) including a process stop key 12a (e.g., a back key). When the process stop key 12a is operated by a user, the controlling unit 20 cancels a process that is being performed and causes the displaying unit 14 to display a predetermined screen (for example, a start screen). Moreover, in the present embodiment, the description "canceling process" signifies that the process cannot be restarted. In other words, "canceling process" may be restated as "ending process".

(Print Data Sending Process)

Next, a print data sending process to be performed by the mobile telephone device 10 will be described. By operating the operating unit 12, the user may cause the displaying unit 14 to display a desired image. For example, according to an operation of the operating unit 12 by the user, the controlling unit 20 may acquire web data on the Internet and cause the displaying unit 14 to display an image represented by the web data.

By operating the operating unit 12, the user may perform an activation operation for activating the print application 32. When the activation operation is performed, according to the print application 32, the controlling unit 20 converts data (e.g., web data) representing an image displayed on the displaying unit 14 into print data having a data format (e.g., JPEG or PDF) that can be interpreted by the printer 200.

Figure 2:
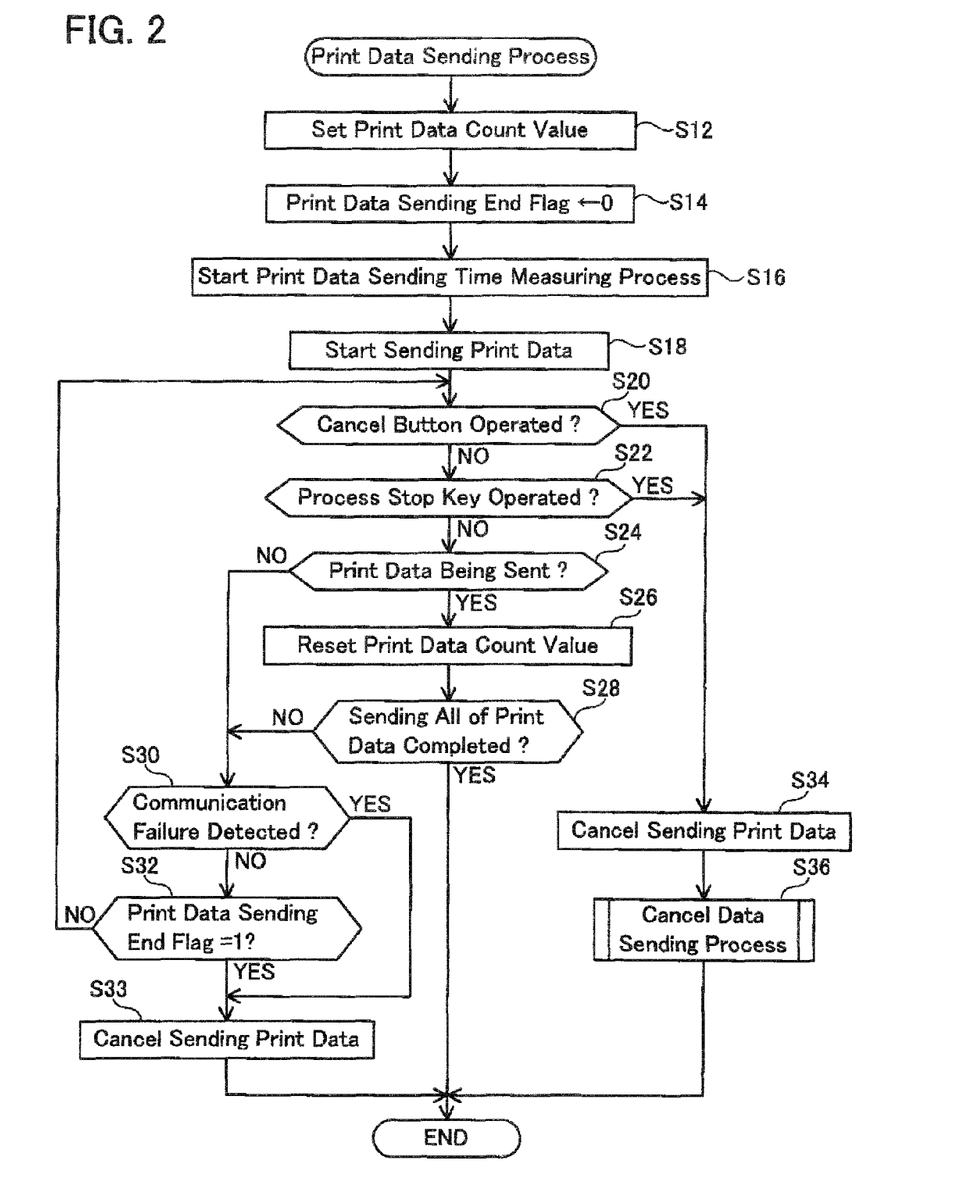
FIG. 2 is a flow chart of a print data sending process.

As shown in FIG. 2, when the print data is generated, the second measuring unit 44 sets a print data count value (for example, 60 seconds) determined in advance (S12). Next, the second measuring unit 44 sets a value of a print data sending end flag in the memory 30 to "0" (S14). The second measuring unit 44 then starts a print data sending time measuring process (S16) (cf. FIG. 3). The first sending unit 40 starts sending the print data in parallel with the print data sending time measuring process (S18). In other words, the first sending unit 40 sends packets including the print data to the printer 200 via the access point 100. The first sending unit 40 sends the print data by dividing the print data into a plurality of packets. Moreover, the mobile telephone device 10 communicates with the printer 200 using LPR (Line Printer Daemon Protocol). In another embodiment, the mobile telephone device 10 may be configured to communicate with the printer 200 using a standard TCP/IP port monitor.

When sending the print data starts in S18, the controlling unit 20 causes the displaying unit 14 to display a screen 14a (cf. FIG. 1). The screen 14a includes a bar 14c indicating a progress status of the print data sending process and a cancel button 14b. By operating the operating unit 12, the user may operate the cancel button 14b in the screen 14a. The first sending unit 40 monitors the operation on the cancel button 14b by the user (S20). When the cancel button 14b is operated (YES in S20), the flow proceeds to S34.

In addition, the first sending unit 40 monitors an operation of the process stop key 12a in the operating unit 12 by the user (S22). When the cancel button 14b is not operated (NO in S20) but the process stop key 12a is operated (YES in S22), the flow proceeds to S34. On the other hand, when the process stop key 12a is not operated (NO in S22), the first sending unit 40 determines whether or not print data is actually being sent (S24). Specifically, the first sending unit 40 first identifies the number of packets that have not been sent among the plurality of packets including the print data. Next, the first sending unit 40 determines whether or not the identified number has decreased from the number of packets that have not been sent identified in the process of the previously-performed S24. When the number of packets that have not been sent is unchanged, the first sending unit 40 determines that the print data is not actually being sent (NO in S24) and proceeds to S30.

When the number of packets that have not been sent has decreased, the first sending unit 40 determines that the print data is actually being sent (YES in S24), and the second measuring unit 44 resets the count value for print data to a value (such as 60 seconds) determined in advance (S26). Next, the first sending unit 40 determines whether or not sending all of print data has been completed (S28). The first sending unit 40 makes a determination of NO in S28 when at least one print packet that has not been sent is stored in the memory 30, and proceeds to S30. On the other hand, the first sending unit 40 makes a determination of YES in S28 when no print packets that have not been sent are stored in the memory 30. The print data sending process ends when a determination of YES is made in S28.

In S30, the detecting unit 50 detects whether or not the mobile telephone device 10 is communicably connected with the printer 200. For example, for verifying whether or not communication is possible, the detecting unit 50 sends a specific packet to the printer 200 at regular time intervals. When a response to the specific packet is not received within a prescribed period of time, the detecting unit 50 determines that the mobile telephone device 10 is not communicably connected with the printer 200 (YES in S30). The situation described above occurs when the printer 200 is not connected with the access point 100 due to, e.g., power of the printer 200 being turned off. When a determination of YES is made in S30, the first sending unit 40 cancels sending of print data even if sending all of the print data has not been completed (S33). Moreover, as described above, "canceling sending print data" signifies that sending of the print data cannot be restarted. Therefore, in S33, the print data is erased from the memory 30. The print data sending process of FIG. 2 ends after ending S33.

On the other hand, when a determination of NO is made in S30, the first sending unit 40 determines whether or not the print data sending end flag is "1" (S32). The print data sending end flag may be changed to "1" in a process of FIG. 3 to be described later. When the print data sending end flag is "1" (YES in S32), the first sending unit 40 cancels sending of print data even if sending all of the print data has not been completed (S33). The print data sending process of FIG. 2 ends after ending S33. On the other hand, when the print data sending end flag is "0" (NO in S32), the flow returns to S20.

In S34 performed when either YES in S20 (operation of the cancel button) or YES in S22 (operation of the process stop key), the first sending unit 40 cancels sending the print data even if the sending all of the print data has not been completed. In other words, the print data that has not been sent is erased from the memory 30. According to this configuration, sending the print data may be canceled at a timing desirable to the user. Moreover, when a print instruction is provided over a plurality of times, a plurality of print data is sequentially generated. In S34, e.g., in a case where sending first print data among the plurality of print data is canceled, sending second print data among the plurality of print data which is to be sent after the first print data is also canceled. The same holds for "canceling sending print data" of S33. Next, the second sending unit 48 performs a cancel data sending process (S36) and ends the print data sending process of FIG. 2.

(Print Data Sending Time Measuring Process)

Figure 3:
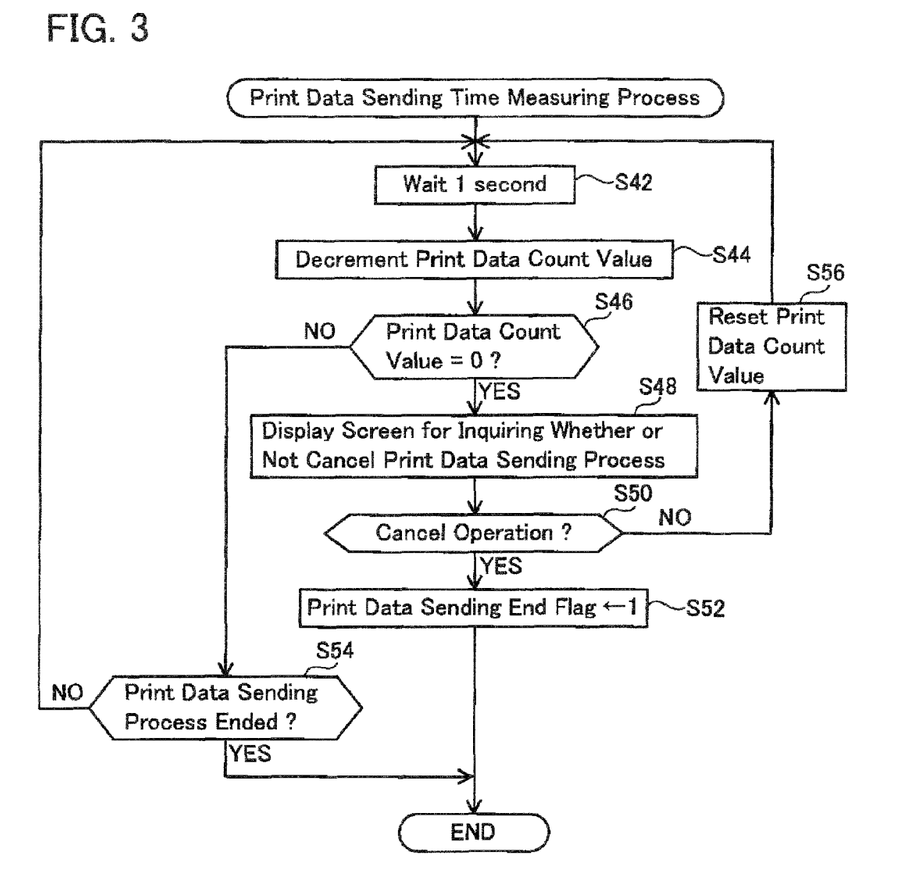
FIG. 3 is a flow chart of a print data sending time measuring process.

Next, contents of the print data sending time measuring process that is started in S16 shown in FIG. 2 will be described with reference to FIG. 3. When the print data count value is set to, for example, "60 seconds" (S12 in FIG. 2), the second measuring unit 44 waits for one second (S42). Next, the second measuring unit 44 decrements "1" from the print data count value (S44). The second measuring unit 44 determines whether or not the print data count value after the decrement is "0" (S46). When the print data count value is determined not to be "0" (NO in S46), the second measuring unit 44 determines whether or not the print data sending process shown in FIG. 2 has been ended (S54). When it is determined that the print data sending process has been ended (YES in S54), the print data sending time measuring process is ended. On the other hand, when it is determined that the print data sending process has not been ended (NO in S54), the flow returns to S42.

Meanwhile, when the count value is determined to be "0" in S46 (YES in S46), the notifying unit 52 causes the displaying unit 14 to display an inquiry screen for inquiring the user as to whether or not to cancel print data sending process (S48). The inquiry screen includes a cancel button and a continue button. By operating the operating unit 12 in a state where the inquiry screen is displayed on the displaying unit 14, the user may perform an operation on the cancel button (hereinafter, referred to as a "cancel operation") and an operation on the continue button (hereinafter, referred to as a "continue operation"). The cancel operation is an operation for canceling the print data sending process, whereas the continue operation is an operation for continuing performing the print data sending process. In another embodiment, the user may perform the cancel operation and the continue operation by performing predetermined operations on the operating unit 12. The second measuring unit 44 monitors operations performed by the user (S50). When the cancel operation is performed by the user (YES in S50), the second measuring unit 44 sets the print data sending end flag to "1" (S52) and ends the print data sending time measuring process. As a result, a determination of YES is made in S32 of the print data sending process (cf. FIG. 2) and the sending the print data is canceled (S33). According to this configuration, the user may end the print data sending process when print data is not sent to the printer 200. A situation in which print data is not sent to the printer 200 may occur in a state where, e.g., available memory in the printer 200 is insufficient and the printer 200 is unable to receive and store print data in the memory of the printer 200 or the mobile telephone device 10 is unable to communicate with the access point 100.

On the other hand, in S50, when the continue operation is performed by the user or when neither the cancel operation nor the continue operation is performed by when a predetermined time elapses after the inquiry screen has been displayed (NO in S50), the second measuring unit 44 resets the count value for print data (S56) and returns to S42.

(Cancel Data Sending Process)

Figure 4:
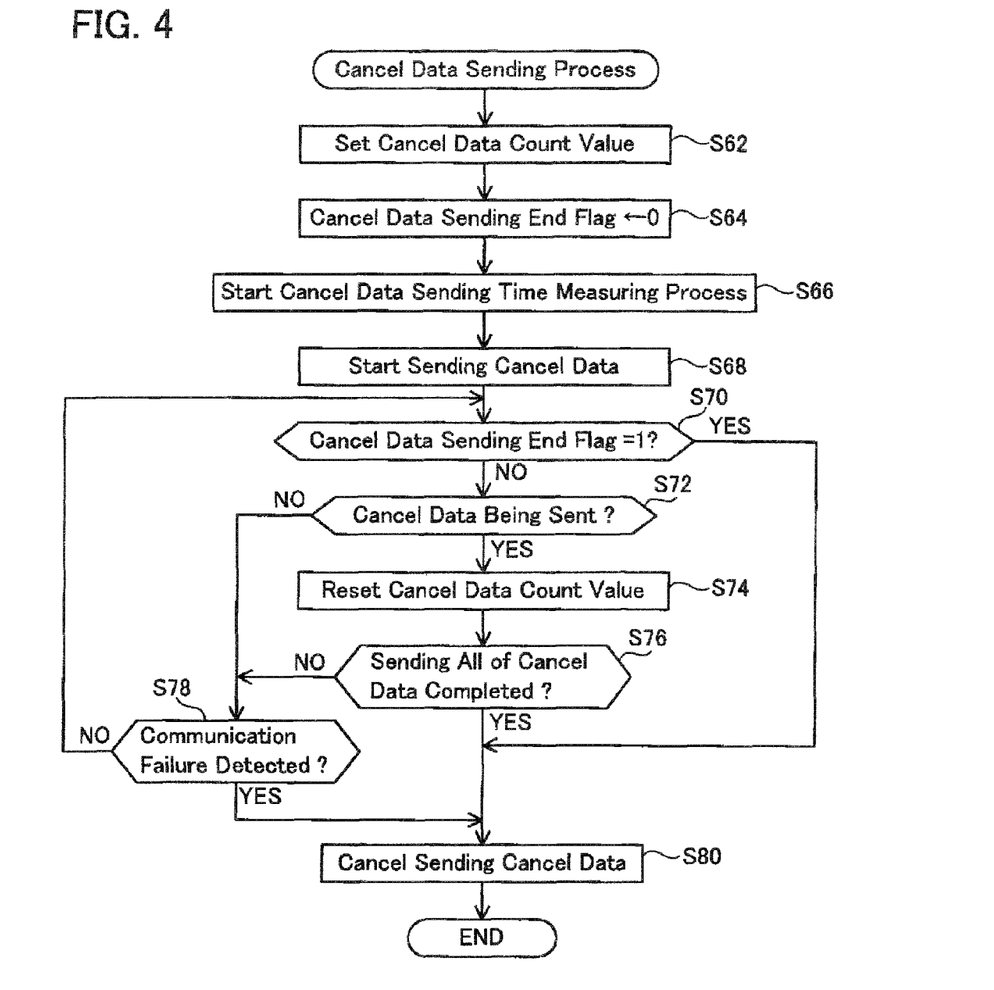
FIG. 4 is a flow chart of a cancel data sending process.

The cancel data sending process that is performed in S36 shown in FIG. 2 will now be described with reference to FIG. 4. First, the first measuring unit 42 sets a cancel data count value (e.g., 60 seconds) determined in advance (S62). Next, the first measuring unit 42 sets a value of a cancel data sending end flag in the memory 30 to "0" (S64). The first measuring unit 42 then starts a cancel data sending time measuring process (cf. FIG. 5) (S66). The second sending unit 48 starts sending cancel data in parallel with the cancel data sending time measuring process (S68). The cancel data is temporarily stored in a temporary storage area in the memory 30 and then sent to the printer 200. In addition, the first sending unit 40 sequentially erases data whose sending to the printer 200 has been completed among the cancel data from the temporary storage area.

When sending cancel data is started, the second sending unit 48 determines whether or not the value of the cancel data sending end flag is "1" (S70). The cancel data sending end flag may be changed to "1" in a process of FIG. 5 to be described later. When the value of the cancel data sending end flag is "1" (YES in S70), the flow proceeds to S80. On the other hand, when the value of the cancel data sending end flag is "0" (NO in S70), the second sending unit 48 determines whether or not cancel data is actually being sent (S72). Specifically, first, the second sending unit 48 identifies an available space in the temporary storage area in the memory 30. Next, the second sending unit 48 determines whether or not the identified available space has increased from the available space of the temporary storage area identified in the process of a previously-performed S72. When the available space of the temporary storage area has increased, the second sending unit 48 determines that cancel data is actually being sent (YES in S72). On the other hand, when the available space of the temporary storage area has not changed, the second sending unit 48 determines that cancel data is not actually being sent (NO in S72).

Moreover, in another embodiment, the second sending unit 48 may be configured to divide the cancel data into a plurality of packets and send the plurality of packets to the printer 200. In this case, in S72, the second sending unit 48 first identifies the number of packets which have not been sent among the plurality of packets in the temporary storage area. Subsequently, the second sending unit 48 may determine that the cancel data is actually being sent when the number of identified packets which have not been sent has decreased from the number of packets which have not been sent identified in the process of a previously-performed S72, and may determine that the cancel data is not actually being sent when the number of identified packets which have not been sent is unchanged.

When it is determined that cancel data is actually being sent (YES in S72), the first measuring unit 42 resets the cancel data count value to a predetermined value (for example, 60 seconds) (S74). Next, the second sending unit 48 determines whether or not sending all of the cancel data has been completed (S76). The second sending unit 48 makes a determination of NO in S76 when the cancel data is stored in the temporary storage area, and proceeds to S78. On the other hand, the second sending unit 48 makes a determination of YES in S76 when cancel data is not stored in the temporary storage area, and ends the cancel data sending process. Upon receiving the cancel data, the printer 200 erases the print data received from the mobile telephone device 10 prior to receiving the cancel data from the memory.

In S72, when it is determined that the cancel data is not actually being sent (NO in S72), the flow proceeds to S78. In S78, the detecting unit 50 detects whether or not the mobile telephone device 10 is communicably connected with the printer 200. The process of S78 is similar to the process of S30 in FIG. 2. When YES in S78, the flow proceeds to S80. In S80, the second sending unit 48 cancels sending of the cancel data even if sending all of the cancel data is not completed (S80). Moreover, as described earlier, "canceling sending the cancel data" signifies that sending of the cancel data cannot be restarted. Therefore, in S80, the cancel data is erased from the temporary storage area. The cancel data sending process of FIG. 4 ends upon conclusion of S80. On the other hand, when NO in S78, the flow returns to S70.

Moreover, the second sending unit 48 does not cancel sending the cancel data even if the process stop key 12a is operated by the user when the cancel data sending process is being performed. As a result, sending the cancel data may be prevented from being canceled even if the process stop key 12a is erroneously operated.

(Cancel Data Sending Time Measuring Process)

Figure 5:
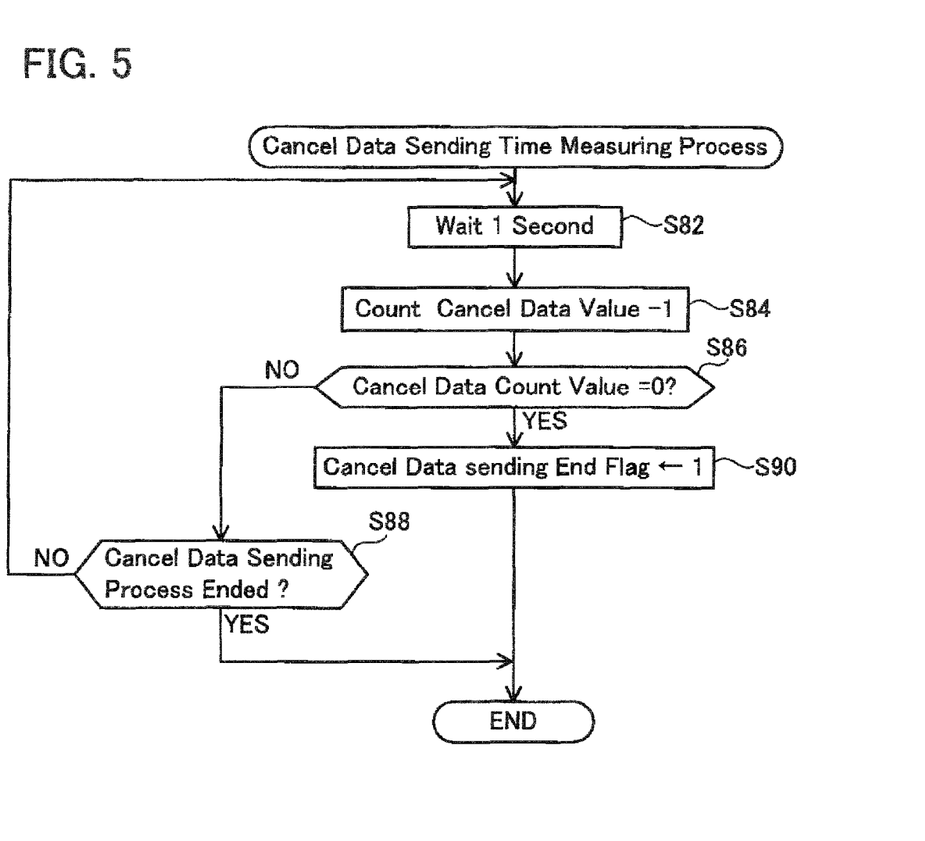
FIG. 5 is a flow chart of a cancel data sending time measuring process.

Next, the cancel data sending time measuring process that is started in S66 shown in FIG. 4 will be described with reference to FIG. 5. When the cancel data count value is set to, e.g., "60 seconds" (S62 in FIG. 4), the first measuring unit 42 waits for one second (S82). Next, the first measuring unit 42 decrements "1" from the cancel data count value (S84). The first measuring unit 42 determines whether or not the cancel data count value after the decrement is "0" (S86). When it is determined that the cancel data count value is not "0" (NO in S86), the first measuring unit 42 determines whether or not the cancel data sending process of FIG. 4 has been ended (S88). When it is determined that the cancel data sending process has been ended (YES in S88), the cancel data sending time measuring process is ended. On the other hand, when it is determined that the cancel data sending process has not been completed (NO in S88), the flow returns to S82.

Meanwhile, in S86, when it is determined that the cancel data count value is "0", the first measuring unit 42 sets the cancel data sending end flag to "1" (S90) and ends the cancel data sending time measuring process. As a result, a determination of YES is made in S70 of the cancel data sending process (cf. FIG. 4) and sending the cancel data is canceled.

An embodiment has been described in detail above. For example, there may be cases where the mobile telephone device 10 is unable to send data to the printer 200 even though the mobile telephone device 10 is communicably connected with the printer 200. The printer 200 prints an image represented by data stored in memory of the printer 200 onto a printing paper. There may be cases where the printer 200 is unable to perform printing such as when printer paper runs out, when toner runs out, and the like. In such a case, the printer 200 retains print data in the memory until printing is performed by using the print data in the memory. As a result, available space in the memory of the printer 200 may run out, in which case data can no longer be newly received. In such a state, by having the user replenish printing paper to the printer 200 or exchange the toner, the printer 200 becomes capable of printing using print data in the memory.

Figure 6A:
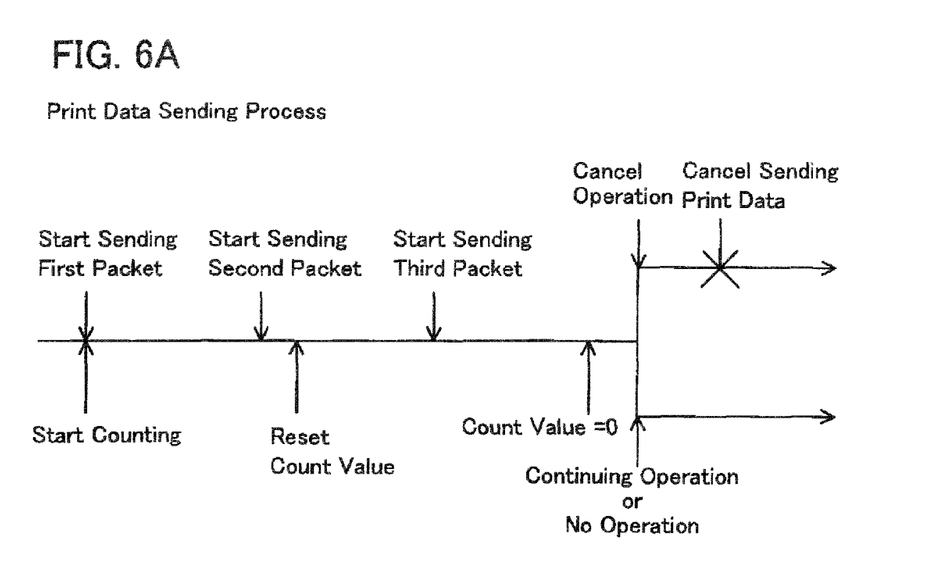
FIG. 6A is a time chart of the print data sending process.

As shown in FIG. 6A, in the print data sending process, the mobile telephone device 10 sequentially sends a plurality of packets including print data. During sending a first packet and a second packet is being performed, packets are actually being sent and the print data count value is reset (refer to S26 in FIG. 2). However, when available space in the memory of the printer 200 runs out during sending a third packet, the mobile telephone device 10 becomes unable to send the third packet. In this case, even if the print data count value changes to "0" (YES in S46 in FIG. 3), sending the print data is not canceled unless a cancel operation is performed by the user. By continuously performing sending print data, the mobile telephone device 10 may send the print data to the printer 200. As a result, e.g., by having the user replenish printing paper to the printer 200 or exchange the toner, the printer 200 becomes capable of printing using print data in the memory. Consequently, the user can acquire a desired printing result.

On the other hand, when the print data count value changes to "0" (YES in S46 in FIG. 3) and a cancel operation is performed by the user, sending the print data is canceled. The mobile telephone device 10 is capable of canceling sending the print data in accordance with an instruction provided by the user. Consequently, the user can use other functions of the mobile telephone device 10.

In addition, when the cancel button is operated by the user (YES in S20), it is highly likely that the user does not desire to acquire a print result and instead desires to use other functions (e.g., a phone function) of the mobile telephone device 10. In this case, when sending cancel data is continuously performed in a state where the mobile telephone device 10 is unable to send the cancel data to the printer 200, the user cannot use the other functions of the mobile telephone device 10.

Figure 6B:
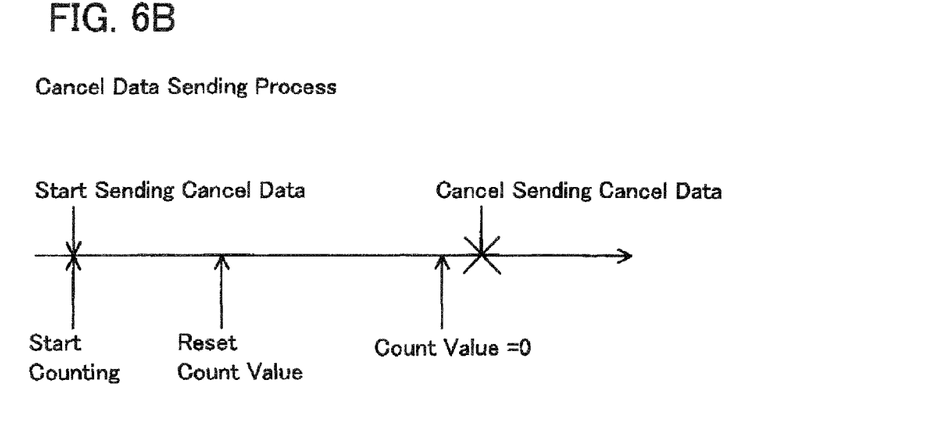
FIG. 6B is a time chart of the cancel data sending process.

As shown in FIG. 6B, with the mobile telephone device 10, when the cancel data is actually being sent during the cancel data sending process (S72 in FIG. 4), the cancel data count value is reset (S74 in FIG. 2). When the cancel data count value changes to "0" without the cancel data being sent (S86 in FIG. 5) or, in other words, when a state where the cancel data cannot actually be sent to the printer 200 continues for a predetermined time, the mobile telephone device 10 cancels sending the cancel data without making an inquiry to the user (YES in S70 in FIG. 4). Therefore, sending the cancel data may be prevented from being continuously performed in a state where the cancel data cannot be sent to the printer 200. As a result, the user can use other functions of the mobile telephone device 10. With the mobile telephone device 10, sending of data may be appropriately controlled according to the type of data (print data or cancel data) to be sent.

The mobile telephone device 10 communicates with the printer 200 using LPR. Therefore, unlike a case where communication with the printer 200 is performed using a standard TCP/IP port monitor, the mobile telephone device 10 is unable to acquire, from the printer 200, information indicating a state of the printer 200 (out of paper, out of toner). Consequently, the mobile telephone device 10 is incapable of controlling data sending processes according to the state of the printer 200. The present embodiment is useful in such situations.

When it is detected that the mobile telephone device 10 is not communicably connected with the printer 200 (S30 in FIG. 2, S78 in FIG. 4), the mobile telephone device 10 cancels sending print data and sending cancel data. Therefore, the printer 200 is capable of preventing sending data to be continuously performed in a state where the mobile telephone device 10 is not capable of communicating with the printer 200. Since the mobile telephone device 10 is carried around by the user, the state of communication with the access point 100 becomes unstable as compared to a stationary terminal device such as a desktop PC. Therefore, a change may readily occur from a first state in which the mobile telephone device 10 is capable of sending data to the printer 200 to a second state in which the mobile telephone device 10 is incapable of sending data to the printer 200. When a change occurs from the first state to the second state, the mobile telephone device 10 may prevent sending data from being continuously performed even though the mobile telephone device 10 is not capable of communicating with the printer 200. Even during sending print data, when it is detected that the mobile telephone device 10 is not capable of communicating (YES in S30 in FIG. 2), the mobile telephone device 10 cancels the process without performing the cancel data sending process. Since it is detected that the mobile telephone device 10 is not capable of communicating, it is highly likely that an attempt to send cancel data to the printer 200 is to fail. Therefore, an effect of reducing a load of the mobile telephone device 10 of performing an unnecessary process may be achieved.

When print data is actually being sent (YES in S24 in FIG. 2), the mobile telephone device 10 resets the print data count value (S26 in FIG. 2). As a result, canceling of the print data sending process can be prevented even though the print data is actually being sent. The same holds for the cancel data sending process.

Moreover, the mobile telephone device 10 is an example of a "terminal device" and the printer 200 is an example of an "external device". The print data sending process is an example of a "first sending process" and the cancel data sending process is an example of a "second sending process". Cancel data is an example of a "second type of data". An operation of the cancel button 14b is an example of a "first instruction" and an operation of the process stop key 12a is an example of a "second instruction".

(Modifications)

(1) In the embodiment described above, the mobile telephone device 10 performs the print data sending time measuring process while performing the print data sending process. However, the present invention is not limited thereto. For example, the mobile telephone device 10 may be configured not to perform the print data sending time measuring process when performing the print data sending process. In this case, the mobile telephone device 10 may perform sending the print data until sending the print data is normally completed (YES in S28 in FIG. 2) or until the user operates the cancel button or the process stop key during sending (S20 or S22 in FIG. 2), and may cancel sending the print data when the cancel button or the process stop key is operated (YES in S20 or S22 in FIG. 2).

(2) In the embodiment described above, when the print data is actually being sent (YES in S24 in FIG. 2), the mobile telephone device 10 resets the print data count value (S26 in FIG. 2). Alternatively, the mobile telephone device 10 may be configured not to reset the print data count value regardless of whether the print data is actually being sent. The same holds for the cancel data count value.

(3) In the embodiment described above, the mobile telephone device 10 starts the print data sending time measuring process (S16 in FIG. 2, S42 and S44 in FIG. 3) at a timing where the print data sending process is started (S18 in FIG. 2). Alternatively, the mobile telephone device 10 may be configured to start the print data sending time measuring process when it is determined that print data is not actually being sent (NO in S24 in FIG. 2). The same holds for the cancel data sending process. That is, generally speaking, the first measuring unit 42 may start measuring at any timing as long as time related to a period of duration of the second sending process (in other words, time associated to a period of duration of the second sending process) can be measured. In addition, the second measuring unit 44 may start measuring at any timing as long as time related to a period of duration of the first sending process (in other words, time associated to a period of duration of the first sending process) can be measured.

(4) In the embodiment described above, when the process stop key 12a is operated while the print data sending process is being performed (YES in S22 of FIG. 2), the mobile telephone device 10 cancels sending the print data and erases the print data from the memory 30. However, the mobile telephone device 10 may be configured to temporarily discontinue sending of print data when the process stop key is operated. In this case, the mobile telephone device 10 may retain the print data instead of erasing the print data from the memory 30. In addition, the mobile telephone device 10 may include a process restart key. The mobile telephone device 10 may be configured to restart sending the print data when the process restart key is operated by the user. In other words, the print data retained in the memory 30 may be sent to the printer 200.

(5) In the embodiment described above, when it is detected that the mobile telephone device 10 is not capable of communicating with the printer 200 (S30 in FIG. 2), sending the print data is canceled (S31 in FIG. 2) and the print data is erased from the memory 30. However, the mobile telephone device 10 may be configured to temporarily discontinue sending the print data when it is detected that the mobile telephone device 10 is capable of communicating with the printer 200. In this case, the mobile telephone device 10 may retain the print data instead of erasing the print data from the memory 30. In addition, the mobile telephone device 10 may be configured to detect whether the mobile telephone device 10 is capable of communicating with the printer 200. The mobile telephone device 10 may be configured to restart sending the print data when it is detected that the mobile telephone device 10 is capable of communicating with the printer 200 after it is detected that the mobile telephone device 10 is not capable of communicating with the printer 200. In other words, the mobile telephone device 10 may send the print data retained in the memory 30 to the printer 200. The same holds for the cancel data sending process.

Generally speaking, "stopping a sending process" includes both "discontinuing a sending process" (data to be sent is retained in the memory 30) and "canceling a sending process" (data to be sent is erased from the memory 30).

(6) Besides the mobile telephone device 10, the "terminal device" may be a mobile terminal such as a PDA, a PC, or the like. In addition, besides the printer 200, the "external device" may be a multi-function device, a scanner, a FAX, a mobile terminal (such as a mobile telephone device or a PDA), a PC, or the like.

(7) Besides print data, the "first type of data" may be data for displaying an image on a display unit of the external device, data to be sent to another device by the external device, or the like. Besides cancel data for stopping (prohibiting) the use of the first type of data such as print data by erasing the first type of data from a memory inside the external device such as the printer 200, the "second type of data" may be discontinue data for temporarily stopping (prohibiting) the use of the first type of data by the external device. The mobile telephone device 10 may be configured to send the discontinue data to the printer 200 when a first operation determined in advance is performed by the user and to send the restart data to the printer 200 when a second operation determined in advance is performed by the user. While the printer 200 is configured to retain print data received from the mobile telephone device 10 in a memory of the printer 200 until restart data is received from the mobile telephone device 10, the printer 200 need not perform printing using the print data. The printer 200 may be configured to perform printing using the print data retained in the memory and newly received print data upon receiving the restart data from the mobile telephone device 10.

(8) In the embodiment described above, while the respective units 40 to 52 are realized by having the CPU 22 perform processes according to the print application 32, at least one of the respective units 40 to 52 may be configured to be realized by hardware such as a logic circuit.

Moreover, the technical elements described in the specification and the drawings display technical utility either independently or in various combinations, and are not limited to the combinations stated in the claims in the present application. Furthermore, the technology described as examples in the present specification or drawings achieves a plurality of objects simultaneously, and has technical utility by achieving any one of these objects.

The invention claimed is:

1. A terminal device configured to be connected with an external device via a network, the terminal device comprising:
   a first sending unit configured to perform a first sending process for sending a first type of data to the external device;
   a second sending unit configured to perform a second sending process for sending a second type of data to the external device;
   a first measuring unit configured to measure time related to a period of duration of the second sending process;
   a second measuring unit configured to measure time related to a period of duration of the first sending process; and
   a notifying unit configured to notify a user an inquiry on whether or not to cancel the first sending process when the time measured by the second measuring unit elapses a second predetermined time,
   wherein in a case where an instruction instructing to cancel the first sending process is provided by the user in response to the notification of the notifying unit the first sending unit cancels the first sending process, in a case where the instruction instructing to cancel the first sending process is not provided by the user, the first sending unit continues to perform the first sending process until sending all of the first type of data is completed, the second sending unit continues to perform the second sending process until the time measured by the first measuring unit elapses first predetermined time, and the second sending unit cancels to perform the second sending process when the time measured by the first measuring unit elapses the first predetermined time even if sending all of the second type of data has not been completed.

2. The terminal device as in claim 1, wherein
the second type of data includes information for causing the external device to stop using the first type of data.

3. The terminal device as in claim 1, wherein
when a first instruction is provided by a user while performing the first sending process:
the first sending unit cancels the first sending process; and
the second sending unit starts the second sending process.

4. The terminal device as in claim 1, wherein
when a second instruction is provided by a user while performing the first sending process, the first sending unit stops the first sending process, and
when the second instruction is provided by the user while performing the second sending process, the second sending unit does not stop the second sending process.

5. The terminal device as in one-ef claim 1, further comprising,
a determining unit configured to determine whether or not the second type of data is actually being sent while performing the second sending process, wherein
when it is determined that the second type of data is actually being sent, the first measuring unit resets the time measured by the first measuring unit and newly starts to measure the time.

6. The terminal device as in claim 1, further comprising,
a detecting unit configured to detect that the terminal device is not communicably connected with the external device, wherein
the first sending unit stops the first sending process when it is detected that the terminal device is not communicably connected with the external device while performing the first sending process, and
the second sending unit stops the second sending process when it is detected that the terminal device is not communicably connected with the external device while performing the second sending process.

7. The terminal device as in claim 1, wherein
the external device is a printer configured to perform a print using print data, and
the first type of data includes the print data.

8. The terminal device as in claim 7, wherein
the second type of data includes information for causing the external device to stop using the first type of data.

9. A non-transitory computer readable recording device including a computer program for a terminal device configured to be connected with an external device via a network,
the computer program including instructions for ordering a computer mounted on the terminal device to perform:
performing a first sending process sending a first type of data to the external device;
performing a second sending process sending a second type of data to the external device;
performing a first measuring process measuring time related to a period of duration of the second sending process;
performing a second measuring process measuring time related to a period of duration of the first sending process; and
performing a notifying process notifying a user an inquiry on whether or not to cancel the first sending process when the time measured by the second measuring process elapses a second predetermined time,
in a case where an instruction instructing to cancel the first sending process is provided by the user in response to the notification of the notifying process, the first sending process is canceled,
in a case where the instruction instructing to cancel the first sending process is not provided by the user, the first sending process continues to be performed until sending all of the first type of data is completed,
the second sending process continues to be performed until the time measured in the measuring process elapses predetermined time, and
the second sending process is canceled when the time measured in the measuring process elapses the predetermined time even if sending all of the second type of data has not been completed.

10. A terminal device comprising:
a controlling unit;
a storage unit for storing instructions to be executed by the controlling unit; and
an interface unit configured to be connected with an external device via a network, wherein the instructions, when performed by the controlling unit, cause the controlling unit to function as:
a first sending unit configured to perform a first sending process for sending a first type of data to the external device;
a second sending unit configured to perform a second sending process for sending a second type of data to the external device;
a first measuring unit configured to measure time related to a period of duration of the second sending process;
a second measuring unit configured to measure time related to a period of duration of the first sending process; and
a notifying unit configured to notify a user an inquiry on whether or not to cancel the first sending process when the time measured by the second measuring unit elapses a second predetermined time,
wherein in a case where an instruction instructing to cancel the first sending process is provided by the user in response to the notification of the notifying unit, the first sending unit cancels the first sending process,
in a case where the instruction instructing to cancel the first sending process is not provided by the user, the first sending unit continues to perform the first sending process until sending all of the first type of data is completed,
the second sending unit continues to perform the second sending process until the time measured by the first measuring unit elapses first predetermined time, and
the second sending unit cancels to perform the second sending process when the time measured by the first measuring unit elapses the first predetermined time even if sending all of the second type of data has not been completed.

* * * * *